A. S. HUBBARD & E. VAN WAGENEN.
ELECTRICAL SYSTEM OF DISTRIBUTION.
APPLICATION FILED DEC. 27, 1906.

1,010,497.

Patented Dec. 5, 1911.

A. S. HUBBARD & E. VAN WAGENEN.
ELECTRICAL SYSTEM OF DISTRIBUTION.
APPLICATION FILED DEC. 27, 1906.

1,010,497.

Patented Dec. 5, 1911.

UNITED STATES PATENT OFFICE.

ALBERT S. HUBBARD, OF BELLEVILLE, NEW JERSEY, AND EDWARD VAN WAGENEN, OF NEW YORK, N. Y., ASSIGNORS TO GOULD STORAGE BATTERY COMPANY, A CORPORATION OF NEW YORK.

ELECTRICAL SYSTEM OF DISTRIBUTION.

1,010,497.     Specification of Letters Patent.     Patented Dec. 5, 1911.

Application filed December 27, 1906. Serial No. 349,631.

*To all whom it may concern:*

Be it known that we, ALBERT S. HUBBARD, a citizen of the United States, and a resident of Belleville, Essex county, State of New Jersey, and EDWARD VAN WAGENEN, a citizen of the United States, and a resident of the city, county, and State of New York, have invented certain new and useful Improvements in Electrical Systems of Distribution, of which the following is a specification.

Our invention relates to improvements in electrical systems of distribution and is directed mainly to the protection of the apparatus employed for automatic regulation under abnormal conditions and to the adjustment of the system to such conditions.

The various features of our invention have been devised with reference to a system in which a storage battery is operatively related with an alternating current power plant in such a way as to maintain a reasonably steady load on the generating plant despite fluctuations of load on the work circuit or circuits of the system. Certain features of our invention, as will hereinafter appear, are peculiar to a system in which a battery of this character is to be regulated responsively to the changes of current or electrical condition of the generating station.

Referring to the drawings.

Figures 1, 2:
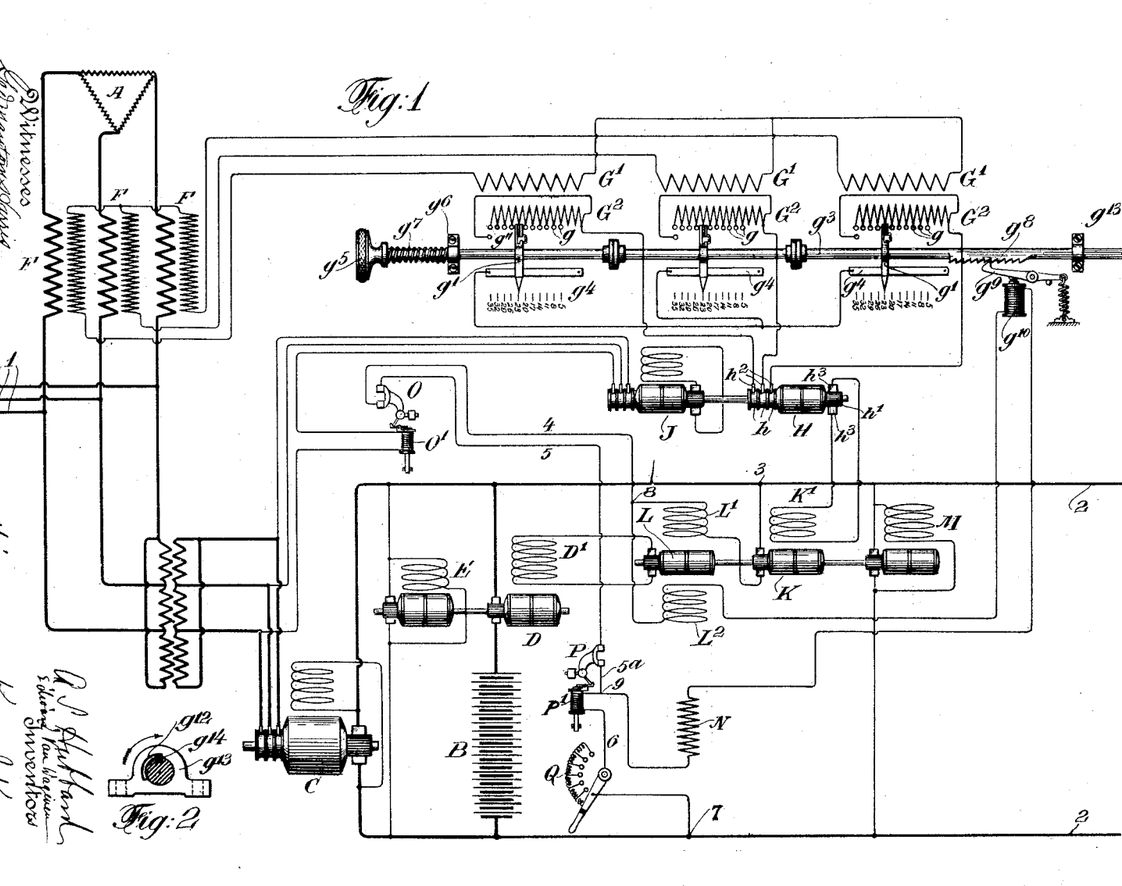
Figure 1 is a diagram illustrating a system of distribution embodying the various features of our invention.
Fig. 2 is a transverse section of a slotted bearing bar shown in Fig. 1.

We will first generally describe the character of the system shown in Fig. 1 with which we have combined the various features of our invention.

A represents an alternating current source of supply which may be a dynamo or a number of dynamos, or which may be the alternating current end or ends of a motor generator or rotary converter at a sub-station.

B represents a battery which is to be regulated to charge or discharge in such a way as to steady the load on the main generator.

C represents a rectifying device, in this case illustrated as a rotary converter, which forms a connection between the generator A and the battery.

The battery action is controlled by the booster D in series with the battery, this booster being driven by the motor E.

At 1 we have indicated an alternating current work circuit, and at 2 a direct current work circuit. Either or both of these circuits may be employed. If the circuit 1 is to be employed and has fluctuations of current therein that will require energy from the battery during a portion of the time, then the rectifying device C must be one capable of receiving energy at either end and delivering it at the other end.

This general character of system, not novel to this application, operates in the following way. When the electro-motive-force of the booster D is high and in the same direction as that of the battery, the battery will discharge to the work circuit 2 or to the rectifier, enabling the latter to supply energy to the work circuit 1 or to both work circuits according to conditions. In the specific case illustrated there are two work circuits and no independent direct current generator. It is clear that the battery would have to supply the entire energy to the work circuit 2 before it could supply energy through the rectifier to the work circuit 1. As the booster voltage drops the battery will supply less current and the generator A will supply a greater portion of the energy consumed at the work circuits. When the booster voltage is zero such a system is ordinarily adjusted so that the battery will float across the line neither charging nor discharging. When the booster voltage is in a direction opposed to that of the battery then the battery will charge, the generator A supplying the necessary energy through the rectifying device C as well as the necessary energy for the various work circuits. The greater the voltage of the booster in this direction, the greater will be the amount of the charging current. The principal automatic regulation in such a system is that which varies the direction and amount of the electro-motive-force generated by the booster responsively to the changes of current flow in the system for which the battery is to compensate. At the present time it has become the most usual practice wherever the battery is used to steady the load on the main generator to regulate the booster responsively to changes on the main generator, magnifying apparatus being employed so that a small change of generator load or current will produce a relatively large change of electro-motive-force. The system herein illustrated adopts this method.

We will now briefly describe, although not novel to the present application, the regulating apparatus shown. The transformers F are series transformers, whose primaries are placed in a part of the circuit where they will receive current that varies responsively to that of the main generator. The coils of these transformers are the prime regulating coils of the system. The secondaries of these transformers are connected to the primaries G' of a second set of transformers having secondaries G². It is not essential for the purposes of the regulation desired or for the purposes of our present invention to employ this additional set of transformers, but we have found it preferable in practice from the standpoint of design and safety to employ this second set of transformers. It will also be understood that while we have shown a three phase circuit and transformers for each leg of the circuit, yet that the number of transformers required for the most efficient operation depends both upon the number of phases employed and also upon the character of the work, thus, if the work circuit 1 is always well balanced, only one transformer F would be needed.

Since the primaries of transformers F are in the generator circuit and the primaries G' are connected to the secondaries of transformers F, the current in the secondaries G² must always vary with the variations of current of the main generator.

H is a rectifier which we have indicated as one having a rotatable iron core whose windings are connected at one end to collector rings $h$ and at the other end to the commutator $h'$. The brushes $h^2$ bearing on the collector rings are connected to the secondaries G² through an intermediate switching device to be hereinafter described. The brushes $h^3$ bearing on the commutator and the rectifier are connected to a field winding $k'$ of one of the regulating machines.

The rectifier H is preferably of the type having magnetic induction and, with the circuits so connected as to produce a rotary field but having no field magnet, the device is devoid of motor action. This device for this purpose has been fully set forth in an application for Letters Patent of the United States by Edward Van Wagenen, filed July 2, 1906, Ser. No. 324,424, and with certain improvements by which changes of power factor are compensated for in an application filed by Albert S. Hubbard, July 2, 1906, Ser. No. 324,393. This rectifier is driven by a synchronous motor J connected across the alternating current circuit, the rectifier being thus driven in synchronism with the voltage of the main generator. The rotary field of rectifier H remains stationary in space if a fixed power factor be assumed, the connections being such that it rotates relatively to the core of the rectifier in the opposite direction to the rotation of the core. The brushes $h^3$ are so placed as to be coincident with the rotary magnetic field.

It will be seen that the coöperation of the foregoing parts results in a current flow in the field coil K' that is affected by variations of current of the main generator. This field coil K' is the energizing coil of the counter machine or regulating dynamo K whose armature is in series with the field winding L' of an exciter L, the current of which energizes the booster field D'. The machines K and L are driven by the motor M. The normal circuit of the counter machine K and the field winding L' is as follows. From the point 3 connected to say the positive side on the direct current end of the rectifying end of the device C, from the counter machine K, the field winding L', thence up through the conductors 4, 5, and 6 to the point 7 at the negative side of the rectifying device C. In describing this circuit we have purposely refrained from describing certain devices therein connected with the features of our present invention. It will be seen, therefore, that the coil L' has applied to it a potential difference existing between the points 3 and 7 which is that of the direct current end of the rectifying device C and has also applied to it the electro-motive-force or potential difference of the dynamo K. These two potential differences are in opposition to each other so that the resultant or difference of these opposing differences is that which acts upon the field winding L'. In practice the system would be so adjusted that with a desired average current on the main generator A there would be just sufficient current in the coil K' to cause the potential difference generated by the counter machine K to equal that developed across the points 3, 7. Under these circumstances there would be no current in the coil L' and therefore no current in the booster field winding D'. When the load upon the generator A increases the difference of potential of K is greater than that of the line and a booster voltage is developed in one direction. When the load upon the generator A is less than that of the desired average, the voltage of the counter machine K would be less than that of the line and therefore there would be a current flow in the booster winding D' in the opposite direction. Certain other changes of load of current upon the generator A would cause a proper regulation of the battery to cause it to charge or discharge to meet the conditions caused by such change and maintain the generator load more near steady.

One of the elements in the regulating transformers, in the present instance, the secondary $G^2$, is provided with means for varying the relation between the generator current and the regulation of the battery. To this end we have shown the various secondaries $G^2$ provided with a number of contacts $g$ connected to various points in the winding and switch arms $g'$ carried on a shaft $g^3$ whereby the movement of this shaft will cause the arms to engage these successive contacts. The arms $g'$ engage with continuous contacts $g^4$ forming terminals completing the circuit of the three secondaries $G^2$ and the rectifier H. The contact arms $g'$ also carry pointers passing over the marks of the scale so that the operator by the movement of the shaft $g^3$ can adjust the position of the contact arms to any average current that is desired upon the main generator. The movement of the shaft with its contact arms varies the number of turns of the secondaries $G^2$ in circuit and therefore the relation between the number of turns of the primaries $G'$ and secondaries $G^2$. In a complex system of this character it is of great importance that nothing should happen in the way of an accidental opening of some circuit or abnormal operation of some part of the apparatus that will endanger either the regulating apparatus or seriously derange the system. At the same time it is desirable to reduce any protective or safety apparatus to the minimum. In the present instance, the coil $L'$ being subjected normally to a maximum voltage much less than that of either of the opposing potential differences applied to it would take a greatly increased current if either of these opposing potential differences failed or varied abnormally. Likewise, the voltage produced by L and the current in the booster field coil $D'$ would increase to a very abnormal extent if anything of this kind occurred. If the field coil did not burn out the booster voltage would be such as to discharge the battery with great rapidity besides raising the voltage of the whole system far beyond that for which it is adapted. Again, the efficient operation of the rectifier assumes a constant relation between the speed of the rectifier and the movement of the rotary field thereof, so as to produce a fixed position in space of the latter. Any tendency, therefore, of the synchronous motor J to hunt disturbs this relation and may cause abnormal changes of the current in the coil $K'$. Again sudden wide variations of voltage are sometimes met with in these systems, and such variations may do much harm to the regulation and the regulating apparatus. In order to meet such conditions we have arranged apparatus that will change the action of both the alternating current regulating apparatus or circuit and the direct current regulating apparatus or circuit either when there is an abnormal current in the circuit of the synchronous motor or when from any cause there is an abnormal condition in the direct current regulating circuits.

The action of the alternating current regulating circuits are changed by short circuiting a portion of the transformer winding automatically. In the present instance we provide means for short circuiting the secondaries $G^2$ thereby by-passing the current thereof and reducing the current delivered to the rectifier H practically to zero. Between the handle $g^5$ of the shaft $g^3$ and a fixed bar $g^6$ is a compression spring $g^7$ tending to move the shaft with its three contact arms to the left. The movement of this shaft is normally prevented because there is formed thereon a ratchet $g^8$ engaged by the end of a pivoted lever $g^9$. When, the magnet $g^{10}$ is energized the lever $g^9$, which is an armature for said magnet, is pulled downward and the expansion of the spring $g^7$ moves the shaft and contact arms to the left making each contact arm short-circuit the contacts $g^{11}$ connected to opposite ends of the secondaries $G^2$. When it is desired to manually adjust the switch for the purpose hereinafter described, the shaft is rotated a quarter of a revolution, this being permitted by slot $g^{12}$ in the fixed bar $g^{13}$, which slot forms a way for the key $g^{14}$ carried by the shaft.

To adjust the direct current regulating apparatus we insert in circuit a normally inactive field coil $L^2$ for the exciter L, which field coil is connected to oppose the action of the field coil $L'$. We also insert in circuit a resistance N to decrease the current in the field coil $L'$. The field winding $L^2$ thus inserted acts both as a resistance to reduce the flow of current in the circuit, and also as a field weakening coil. The net result of such an introduction of the field coil $L^2$ and the resistance N or either of them is that despite an abnormal change of the voltage across 3, 7, as for example, by breakage of the main circuit or despite an abnormal change in the voltage of the counter machine K, as by reason of hunting of the synchronous motor or the breakage of a circuit, the current flow through the coils $L'$ and $L^2$ will be insufficient to injure them and the voltage produced by the armature L will be low enough to keep the booster voltage down to a small amount or to kill it entirely as preferred.

In order to obtain the best results, we prefer to actuate the short circuiting switch for the transformer $G^2$ and the field coil or resistance insertion for the exciter L simultaneously upon the occurrence of any derangement either in the alternating current or the direct current circuits. We effect this by employing two circuit breakers which during normal operation maintain a short circuit around the magnet $g^{10}$, the normally inactive field coil $L^2$ and the resistance N. And we make one of these circuit breakers responsive to the condition of the synchronous motor circuit and the other of these circuit breakers responsive to the condition of the direct current regulating circuit. Thus, commencing at the point 3 and tracing the circuit through the field coil $L'$, it will be noted that at the point 8 the circuit divides. The normal circuit is to be through the conductor 4, through the circuit breaker O, thence through the conductor 5, through the circuit breaker P, conductor $5^a$, thence through the coil $P'$ of the circuit breaker P, thence through an adjusting resistance Q (which is only for the purpose of manual adjustment of the system) to the point 7. Between the points 8 and 9 a second path includes the normally inactive field coil $L^2$, the coil of the magnet $g^{10}$ and the resistance N. It will be seen, therefore, that when both the circuit breakers O and P are closed little current will pass through the coils $L^2$, the magnet $g^{10}$ and the resistance N, but if either of these circuit breakers are opened the same current that passes through the field coil $L'$ must pass through the field coil $L^2$ putting into action the magnet $g^{10}$ actuating the short circuiting switch and through the resistance N. As the coil $O'$ of the circuit breaker O is in the circuit of the synchronous motor J any abnormal current in that circuit such as would occur if there were any substantial hunting of the motor, will open the circuit breaker O and cause the simultaneous adjustment of the alternating and direct current circuits described. So also as the coil $P'$ of the circuit breaker P is always in circuit with the field coil $L'$ any abnormal current in that circuit will produce the same results.

Figure 3:
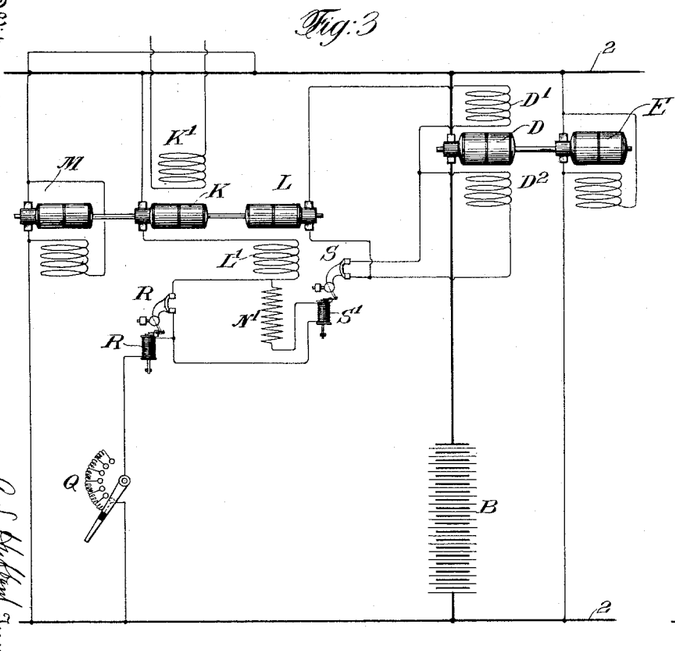
Figs. 3 and 4 are diagrammatic illustrations of a portion of the system showing modifications of certain features of our invention.

In the modification shown in Fig. 3 the normally inactive coil for the direct current regulating circuit is shown at $D^2$ directly on the booster. The circuit breaker R short circuits a resistance $N'$ for the exciter field circuit or circuit of the counter machine and also short circuits the coil $S'$ of a circuit breaker S which normally short circuits the coil $D^2$.

Figure 4:
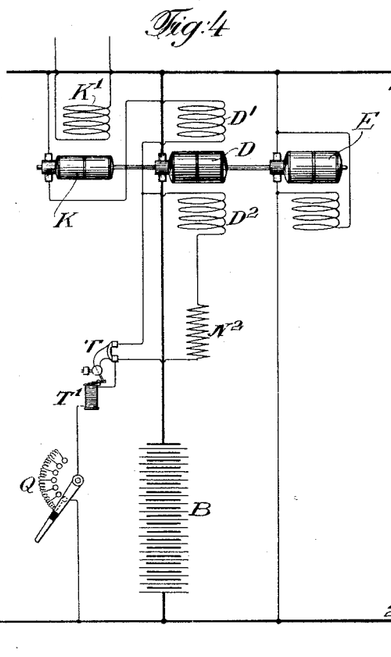

In Fig. 4 we have eliminated the exciter and shown the counter machine acting directly upon the field winding of the booster. In this case the circuit breaker coil $T'$ is, as before, in the circuit of the counter machine, while the circuit breaker T short circuits the normally inactive booster field $D^2$ and a resistance $N^2$ in circuit therewith.

As to both Figs. 3 and 4, the coil $K'$ of the counter machine is shown with its terminals unconnected to any other part of the system. It may, of course, be connected exactly as in Fig. 1 or if the system is entirely a direct current system, which it may be so far as certain features of our invention are concerned, the coil $K'$ could be arranged in any way to be responsive to the fluctuations of the generator of said system.

In practice the circuit breakers O and P should have their latches mechanically connected together in order that when either of the magnets $O'$ and $P'$ actuates its respective latch to open the circuit breaker, both circuit breakers will tend to open. This is desirable because in closing the circuit the operator may first close the circuit breaker whose governing coil is in a circuit where normal conditions are present, he may then close the circuit breaker whose governing coil is in a circuit where abnormal conditions are present. While his hand is on the latter circuit breaker maintaining it closed much harm may be done to the system, whereas if the controlling coil of the latter circuit breaker operates the circuit breaker of the former through the mechanical connection of the two latches, then the circuit breaker first closed will open and insure safety. We have not gone into any specific description or showing of this mechanical connection because circuit breakers mounted on a single base and mechanically connected as to their latches are well known in the art.

While we prefer, as illustrated, to employ the various features of our invention in combination, yet such features and the extent of their combination will necessarily be varied according to the conditions of the particular systems to which they are to be applied, while, moreover, substantial advantages may be obtained without employing all the various features of novelty described. In fact, certain features of our invention appear to be broadly novel and to be useful in connection with a wide variety of systems. We do not, therefore, desire to limit ourselves in any respect except as set forth in the appended claims.

Having thus described our invention, what we claim as new and desire to secure by Letters Patent is:—

1. A system of distribution having alternating current and direct current main or distributing circuits and means for operatively connecting the same, a storage battery connected to the direct current side of the system, regulating alternating current and direct current circuits operatively connected together, and means for automatically changing the action of the alternating current regulating apparatus operated by a safety device in the direct current regulating circuits.

2. A system of distribution having alternating current and direct current main or distributing circuits and means for operatively connecting the same, a storage battery connected to the direct current side of the system, regulating alternating current and direct current circuits operatively connected together, a transformer operatively related with the alternating current regulating circuit, and means for short circuiting one of the elements thereof operated by a device in the direct current regulating circuit.

3. A system of distribution having alternating current and direct current main or distributing circuits and means for operatively connecting the same, a storage battery connected to the direct current side of the system, regulating alternating current and direct current circuits operatively connected together, a transformer operatively related to the alternating current regulating circuit, and means for short circuiting the secondary thereof operated by a device in the direct current regulating circuit.

4. A system of distribution having alternating current and direct current main or distributing circuits and means for operatively connecting the same, a storage battery connected to the direct current side of the system, an alternating current regulating circuit, a transformer therein, a rectifying device supplied by current from said transformer, a direct current regulating circuit supplied by the rectifying device, means controlled by said direct current regulating circuit for regulating the action of the battery, and means for reducing the flow of current to the rectifying device when there is abnormal current in the direct current regulating circuit.

5. A system of distribution having alternating current and direct current main or distributing circuits and means for operatively connecting the same, a storage battery connected to the direct current side of the system, an alternating current regulating circuit, a transformer therein, a rectifying device supplied by current from said transformer, a direct current regulating circuit supplied by the rectifying device, and means for short circuiting one of the elements of said transformer when there is abnormal current in the direct current regulating circuit.

6. A system of distribution having alternating current and direct current main or distributing circuits and means for operatively connecting the same, a storage battery connected to the direct current side of the system, an alternating current regulating circuit, a transformer therein, a rectifying device supplied by current from said transformer, a direct current regulating circuit supplied by the rectifying device, and means for short circuiting the secondary of said transformer when there is abnormal current in the direct current regulating circuit.

7. A system of distribution having alternating current and direct current main or distributing circuits and means for operatively connecting the same, a storage battery connected to the direct current side of the system, an alternating current regulating circuit, a rectifying device supplied thereby, a direct current regulating circuit controlled by the current from the rectifying device, means controlled by said direct current regulating circuit for regulating the action of the battery and means for reducing the alternating current regulating current responsive to abnormal fluctuations of current in the direct current regulating circuit.

8. A system of distribution having alternating and direct current main or distributing circuits and means for operatively connecting the same, a storage battery connected to the direct current side of the system, regulating alternating current and direct current apparatus operatively connected together and arranged to cause regulation of the battery, and safety means for automatically changing the action of the alternating current regulating apparatus responsively to a change in the direct current regulating circuit.

9. In an electrical system of distribution, a compensatory storage apparatus therefor, regulating apparatus for the storage apparatus partly alternating current and partly direct current, regulating circuits therefor operatively related, and means for changing the action of the alternating current regulating apparatus by a safety device in the direct current regulating circuit.

10. In an electrical system of distribution, a compensatory storage apparatus therefor, regulating apparatus therefor, partly alternating current and partly direct current, regulating circuits therefor operatively related, and safety means for changing the action of the alternating current regulating apparatus responsive to an abnormal change in the direct current regulating circuit.

11. In an electrical system of distribution, a compensatory storage apparatus therefor, an alternating current circuit, a transformer therein, a direct current regulating circuit for the storage apparatus, means for controlling the current in the direct current regulating circuit responsive to current changes in the transformer, and means responsive to abnormal conditions in the direct current regulating circuit for reducing the regulating current of said transformer.

12. In an alternating current circuit, a transformer in operative relation therewith, a direct current regulating circuit and apparatus, means for controlling the current in the same responsively to current changes in the transformer, and means responsive to abnormal conditions in the direct current regulating circuit for short circuiting one of the elements of said transformer.

13. In an alternating current circuit, a transformer in operative relation therewith, a direct current regulating apparatus and circuit, means for controlling the current in the same responsively to current changes in the transformer, and means responsive to abnormal conditions in the direct current regulating circuit for by-passing current from said transformer.

14. An alternating current circuit, a transformer in operative relation therewith, a dynamo to be regulated therefrom, a direct current regulating circuit therefor, means for varying the current in said direct current circuit responsively to current changes in said transformer, and means responsive to abnormal conditions in the direct current regulating circuit for altering the regulating effect of the transformer current.

15. An alternating current circuit, a transformer in operative relation therewith, a dynamo to be regulated therefrom, a direct current regulating circuit therefor, means for varying the current in said direct current circuit responsively to current changes in said transformer, and means responsive to abnormal conditions in the direct current regulating circuit for by-passing current from said transformer.

16. An alternating current circuit, a transformer in operative relation therewith, a dynamo to be regulated therefrom, a direct current regulating circuit therefor, means for varying the current in said direct current circuit responsively to current changes in said transformer, and means responsive to abnormal conditions in the direct current regulating circuit for short-circuiting one of the elements of said transformer.

17. The combination of an alternating current generator, a regulating battery in operative relation therewith, a booster in series with the battery, a direct current regulating circuit for said booster, an alternating current regulating circuit responsive to changes of electrical condition of said generator, means for varying the current in said direct current regulating circuit responsively to changes in the alternating current regulating circuit, and safety means responsive to abnormal conditions in the direct current regulating circuit acting upon the alternating current regulating circuit to change the action of the same.

18. The combination of an alternating current generator, a regulating battery in operative relation therewith, a booster in series with the battery, a direct current regulating circuit for said booster, an alternating current regulating circuit responsive to changes of electrical condition of said generator, means for varying the current in said direct current regulating circuit responsively to changes in the alternating current regulating circuit, and a safety device in the direct current regulating circuit operating upon the alternating current regulating circuit to change the action of the same.

19. A system of distribution having alternating current and direct current main or distributing circuits and means for operatively connecting the same, a storage battery connected to the direct current side of the system, a coil connected to the alternating current circuit, a direct current regulating circuit, means for varying the current in said regulating circuit, and means operatively related thereto for regulating the battery action responsively to changes of current in said coil, and means responsive to abnormal conditions in said direct current regulating circuit for short-circuiting said coil.

20. A system of distribution having alternating current and direct current main or distributing circuits and means for operatively connecting the same, a storage battery connected to the direct current side of the system, a coil connected to the alternating current circuit, a direct current regulating circuit, and means connected thereto for regulating the battery action, means for varying the current in said regulating circuit responsively to changes of current in said coil and a safety device in the direct current regulating circuit controlling a circuit about said coil.

21. In an electrical system of distribution, a direct current regulating circuit, a storage apparatus affected thereby, an alternating current circuit, a coil connected thereto, and means responsive to abnormal conditions in the direct current circuit for short-circuiting said coil.

22. In an electrical system of distribution, a direct current regulating circuit, a storage apparatus affected thereby, an alternating current circuit, a coil connected thereto, and a safety device in the direct current regulating circuit controlling a circuit about said coil.

23. The combination of an alternating current generator, a regulating battery in operative relation therewith, a booster in series with the battery, a direct current regulating circuit for said booster, a coil connected to the alternating current circuit, means for varying the current in said regulating circuit responsively to current changes in said coil, and means responsive to abnormal conditions in said direct current regulating circuit for short circuiting said coil.

24. The combination of an alternating current generator, a regulating battery in operative relation therewith, a booster in series with the battery, a direct current regulating circuit for said booster, a coil connected to the alternating current circuit, and in operative relation with said direct current regulating circuit, a circuit about said coil, and a safety device in the direct current regulating circuit controlling said last mentioned circuit.

25. A transformer, a regulating circuit controlled responsively to the current variations thereof, a switch for varying the relative number of turns of the elements of the transformer and having a position short-circuiting one of said elements, means tending to move the switch toward the short-circuiting position, a restraining device preventing said movement, and an electromagnet for releasing the restraining device controlled by the current in said regulating circuit.

26. A transformer, a regulating circuit controlled responsively to the current variations thereof, a switch for varying the relative number of turns of the elements of the transformer and having a position short-circuiting one of said elements, means tending to move the switch toward the short-circuiting position, a restraining device preventing said movement, an electromagnet acting to release said restraining device, and an automatic circuit breaker normally short-circuiting said electro-magnet and actuated by current increase in said regulating circuit.

27. A transformer, a regulating circuit, a movable switch member connected to form a part of said circuit, a plurality of contacts connected to different parts of one of the windings of the transformer and in the line of movement of said switch member, a pair of contacts connected to the terminals of one of said windings and located to be simultaneously engaged by the switch member at one position thereof, means controlled by abnormal current flow in the regulating circuit for moving said switch to said position, a restraining device for said switch, a magnet for releasing said device, and an automatic circuit breaker short-circuiting said magnet.

28. In an electrical system of distribution having an alternating current generator, rectifying device, regulating battery and booster, a coil responsive to changes of alternating generator current and indirectly controlling the booster field strength, means for manually adjusting the ratio between the current in said coil and the current in the generator, and means for automatically short-circuiting said coil responsive to abnormal current changes in the system.

29. In an electrical system of distribution having an alternating current generator, rectifying device, regulating battery and booster, a coil responsive to changes of alternating generator current and indirectly controlling the booster field strength, means for manually adjusting the ratio between the current in said coil and the current in the generator, and means responsive to changes tending to produce an abnormal current in said field for automatically short-circuiting said coil.

30. In an electrical system of distribution, regulating circuits partly alternating current and partly direct current operatively connected, and means for automatically changing the action of both the alternating current and the direct current regulating circuits, when there is an abnormal current in one of them.

31. In an electrical system of distribution, a compensatory storage battery therefor, an alternating current regulating circuit, a direct current circuit controlled thereby, a dynamo for causing the regulation of the battery regulated by the varying current of said direct current circuit, and safety means responsive to abnormal conditions in said direct current circuit for changing the action of both the alternating current and direct current circuits.

32. In an electrical system of distribution, an alternating current circuit, a direct current circuit controlled thereby, a dynamo regulated by the varying current of said direct current circuit, a circuit breaker responsive to a given change of condition of said direct current circuit, a local circuit normally short-circuited by said circuit breaker, and safety apparatus in said local circuit for changing the action of the alternating current and direct current circuits.

33. In an electrical system of distribution, an alternating current generator, a regulating battery in operative relation therewith, a coil receiving alternating current responsive to changes of generator current, a direct current circuit for regulating the battery action, and means responsive to abnormal current in said direct current circuit for short-circuiting said coil and changing the action of the direct current circuit.

34. In an electrical system of distribution, an alternating current generator, a transformer and a regulating battery in operative relation therewith, a direct current circuit for regulating the battery action controlled by the current from said transformer, a switch for short-circuiting part of the windings of said transformer, a resistance, and an electro-responsive device in the direct current regulating circuit controlling the actuation of said switch and the inserting of said resistance in the direct current regulating circuit.

35. In an electrical system of distribution, an alternating current generator, a transformer and a regulating battery in operative relation therewith, a direct current circuit for regulating the battery action controlled by the current from said transformer, a switch for short-circuiting part of the windings of said transformer, a resistance, an electro-magnet for actuating said switch, a circuit-breaker having contacts in the direct current regulating circuit establishing a short-circuit about the coil of the magnet and about said resistance, and a coil controlling said circuit breaker and in the direct current regulating circuit.

36. In an electrical system of distribution, an alternating current generator, a regulating battery in operative relation therewith and arranged to aid the generator in taking part of the load on the system, circuits and apparatus partly alternating current and partly direct current for regulating the battery action, and safety means in said regulating circuits for simultaneously changing the action of the alternating current and direct current regulating apparatus.

37. In an electrical system of distribution, an alternating current generator, a compensatory regulating battery in operative relation therewith, circuits and apparatus partly alternating current, and partly direct current for regulating the battery action, and safety means for simultaneously changing the action of the alternating current and direct current regulating apparatus said means being actuated only upon abnormal increase of current in the direct current regulating circuit.

38. An alternating current circuit, a compensatory regulating apparatus therefor, a rectifier connected to the circuit, a synchronous motor driving said rectifier, a direct current regulating circuit for the apparatus fed from the rectifier, and safety means actuated upon the hunting of said motor for changing the action of said direct current circuit.

39. An alternating current circuit, a compensatory regulating apparatus therefor, a rectifier connected to the circuit, a synchronous motor driving said rectifier, a direct current regulating circuit for the apparatus fed from the rectifier, and means actuated upon the hunting of said motor for reducing the current to said rectifier.

40. An alternating current circuit, a compensatory regulating apparatus therefor, a rectifier connected to the circuit, a synchronous motor driving said rectifier, a direct current regulating circuit for the apparatus fed from the rectifier, and safety means actuated by abnormal current in said synchronous motor for changing the regulating action of said direct current circuit to prevent injury thereto.

41. An alternating current circuit, a compensatory regulating apparatus therefor, a rectifier connected to the circuit, a synchronous motor driving said rectifier, a direct current regulating circuit for the apparatus fed from the rectifier, and means actuated by abnormal current in said synchronous motor for reducing the current to said rectifier.

42. An alternating current circuit, a transformer and a rectifier in series therein, a direct current regulating circuit connected to the rectifier, a synchronous motor driving the rectifier, and means responsive to abnormal current in the synchronous motor for cutting down the effective windings of said transformer.

43. An alternating current circuit, a transformer and a rectifier in series therein, a direct current regulating circuit connected to the rectifier, a synchronous motor driving the rectifier, and means responsive to abnormal current in the synchronous motor for short-circuiting the secondary of said transformer.

44. An alternating current transformer, a rectifier connected thereto, a synchronous motor driving the rectifier, and means actuated upon the hunting of the synchronous motor for altering the connections of said transformer.

45. An alternating current transformer, a rectifier connected thereto, a synchronous motor driving the rectifier, a local circuit connected to the transformer, a switch in said circuit, and means acted upon by abnormal current in the circuit of the synchronous motor for actuating said switch.

46. An alternating current circuit, a transformer and a rectifier in series therein, a direct current regulating circuit connected to the rectifier, a synchronous motor driving the rectifier, and means responsive to abnormal current in the synchronous motor for by-passing current from said alternating current circuit.

47. A dynamo, a regulating circuit therefor, a rectifier in said circuit and supplying current to govern said circuit, a synchronous motor driving said rectifier, a resistance, and a device controlled by the current in the synchronous motor circuit for inserting said resistance in the regulating circuit.

48. A dynamo, a regulating circuit therefor, a rectifier in said circuit and supplying current to govern said circuit, a synchronous motor driving said rectifier, a normally out of circuit field-winding for said dynamo, and a device controlled by the current in the synchronous motor circuit for inserting said field winding in circuit.

49. An alternating current generator, a compensatory regulating battery in operative relation therewith, a direct current circuit and apparatus for varying the battery action, a rectifier receiving a varying alternating current and supplying said direct current circuit, a synchronous motor driving said rectifier, and means actuated by abnormal current in the motor circuit for reducing the current to said rectifier.

50. An alternating current generator, a regulating battery in operative relation therewith, a circuit and apparatus for varying the battery action, a rectifier receiving a varying alternating current and supplying said direct current circuit, a synchronous motor driving said rectifier, and means actuated by abnormal current in the motor circuit for by-passing current from the circuit feeding said rectifier.

51. An alternating current generator, a compensatory regulating battery in operative relation therewith, a direct current regulating circuit and apparatus for varying the battery action, a rectifier receiving a varying alternating current and supplying said direct current circuit, a synchronous motor driving said rectifier, and safety means actuated by abnormal current in the motor circuit for increasing the resistance of the direct current regulating circuit to prevent injury thereto.

52. An alternating current generator, a compensatory regulating battery in operative relation therewith, a direct current regulating circuit and apparatus for varying the battery action, a rectifier receiving a varying alternating current and supplying said direct current circuit, a synchronous motor driving said rectifier, and means actuated by abnormal current in the motor circuit for simultaneously reducing the current to the rectifier and increasing the resistance of the direct current regulating circuit.

53. An alternating current generator, a regulating battery in operative relation therewith, a dynamo for varying the battery action, a rectifier receiving a varying alternating current and supplying a direct current circuit, a field coil for said dynamo receiving a current varying with that of said direct current circuit, a synchronous motor driving said rectifier, and a device responsive to abnormal current in the circuit of said motor for inserting a resistance in series with said field coil.

54. An alternating current generator, a regulating battery in operative relation therewith, a dynamo for varying the battery action, a rectifier receiving a varying alternating current and supplying a direct current circuit, a field coil for said dynamo receiving a current varying with that of said direct current circuit, a synchronous motor driving said rectifier, a second field coil for said dynamo normally out of circuit, and a device responsive to abnormal current in the circuit of said motor for inserting the latter field coil in circuit.

55. An alternating current generator, a regulating battery in operative relation therewith, a dynamo for varying the battery action, a rectifier receiving a varying alternating current and supplying a direct current circuit, a field-coil for said dynamo receiving a current varying with that of said direct current circuit, a synchronous motor driving said rectifier, and a device responsive to abnormal current in the circuit of said motor for reducing the current to said rectifier.

56. An alternating current generator, a regulating battery in operative relation therewith, a dynamo for varying the battery action, a rectifier receiving a varying alternating current and supplying a direct current circuit, a field coil for said dynamo receiving a current varying with that of said direct current circuit, a synchronous motor driving said rectifier, and a device responsive to abnormal current in the circuit of said motor for by-passing current from the circuit feeding said rectifier.

57. An alternating current circuit, a rectifier feeding a direct current regulating circuit, a synchronous motor driving the rectifier, and a device responsive to abnormal current in the circuit of said motor for reducing the current to said rectifier.

58. An alternating current circuit, a rectifier feeding a direct current regulating circuit, a synchronous motor driving the rectifier, and a device responsive to abnormal current in the circuit of said motor for by-passing the current from the circuit feeding said rectifier.

59. An alternating current circuit, a transformer therein, a direct current regulating circuit, a rectifier connecting the transformer with the direct current circuit, a synchronous motor driving said rectifier, and a device responsive to abnormal current in the circuit of said motor for short-circuiting a portion of said transformer.

60. An alternating current circuit, a transformer therein, a direct current regulating circuit, a rectifier connecting the transformer with the direct current circuit, a synchronous motor driving said rectifier, a short-circuiting switch for one of the elements of said transformer, a magnet controlling the actuation of said switch, and a device controlling said magnet responsive to abnormal current in the circuit of said motor.

61. An alternating current circuit, a transformer therein, a direct current regulating circuit, a rectifier connecting the transformer with the direct current circuit, a synchronous motor driving said rectifier, a short-circuiting switch for one of the elements of said transformer, a magnet controlling the actuation of said switch, a circuit breaker normally short circuiting said magnet, and a coil for said circuit breaker in the circuit of said motor.

62. An alternating current circuit, a transformer therein, a direct current regulating circuit, a rectifier connecting the transformer with the direct current circuit, a synchronous motor driving said rectifier, and means actuated upon abnormal current in the circuit of said motor for changing the action of the direct current regulating circuit.

63. A polyphase alternating current circuit, a transformer connected to more than one phase thereof, a rectifier connected to the transformer, a direct current regulating circuit connected to the brushes of the rectifier, a synchronous motor driving the rectifier, and means actuated upon the hunting of the motor for reducing the current to the rectifier.

64. A polyphase alternating current circuit, a transformer connected to more than one phase thereof, a rectifier connected to the transformer, a direct current regulating circuit connected to the brushes of the rectifier, a synchronous motor driving the rectifier, and means actuated upon the hunting of the motor for short-circuiting one of the elements of the transformer.

65. A polyphase alternating current circuit, a transformer connected to more than one phase thereof, a rectifier connected to the transformer, a direct current regulating circuit connected to the brushes of the rectifier, a synchronous motor driving the rectifier, and means actuated upon the hunting of the motor for reducing the current to the rectifier and changing the action of the direct current regulating circuit.

66. In an electrical system of distribution, the combination with main or distribution circuits, of alternating current and direct current regulating apparatus and appropriate circuits therefor, devices for changing the action of the regulating apparatus respectively, and two independent means for actuating both devices, one means being responsive to abnormal conditions in one of the alternating current circuits, and the other to abnormal conditions in one of the direct current circuits.

67. The combination of a main alternating current generator, a regulating battery in operative relation thereto, a transformer receiving a current varying with variations of electrical condition of said generator, a rectifier receiving current from said transformer, a synchronous motor driving said rectifier, regulating circuits controlled by the current from the direct current end of the rectifier and controlling the battery action, and safety means actuated upon abnormal current in the circuit of the motor for short-circuiting part of the windings of said transformer.

68. The combination of a main alternating current generator, a regulating battery in operative relation thereto, a transformer receiving a current varying with variations of electrical condition of said generator, a rectifier receiving current from said transformer, a synchronous motor driving said rectifier, regulating circuits controlled by the current from the direct current end of the rectifier and controlling the battery action, and safety means actuated upon abnormal current in the circuit of the motor for short-circuiting part of the windings of said transformer and for changing the action of the direct current regulating circuit.

69. The combination of a main alternating current generator, a regulating battery in operative relation thereto, a transformer receiving a current varying with variations of electrical condition of said generator, a rectifier receiving current from said transformer, a synchronous motor driving said rectifier, regulating circuits controlled by the current from the direct current end of the rectifier and controlling the battery action, and safety means actuated upon abnormal current in the circuit of the motor for changing the action of the direct current regulating circuit.

In testimony whereof, we have signed our names to this specification, in the presence of two subscribing witnesses.

ALBERT S. HUBBARD.
EDWARD VAN WAGENEN.

Witnesses as to Hubbard:
  RICHARD EYRE,
  A. DALY.

Witnesses as to Van Wagenen:
  J. HOMER REED,
  L. LITTLEFIELD, Jr.

---

Copies of this patent may be obtained for five cents each, by addressing the "Commissioner of Patents, Washington, D. C."